Sept. 27, 1955
O. WEISS
2,718,929
SEISMIC METHOD OF GEOLOGICAL EXPLORATION
Filed June 18, 1951
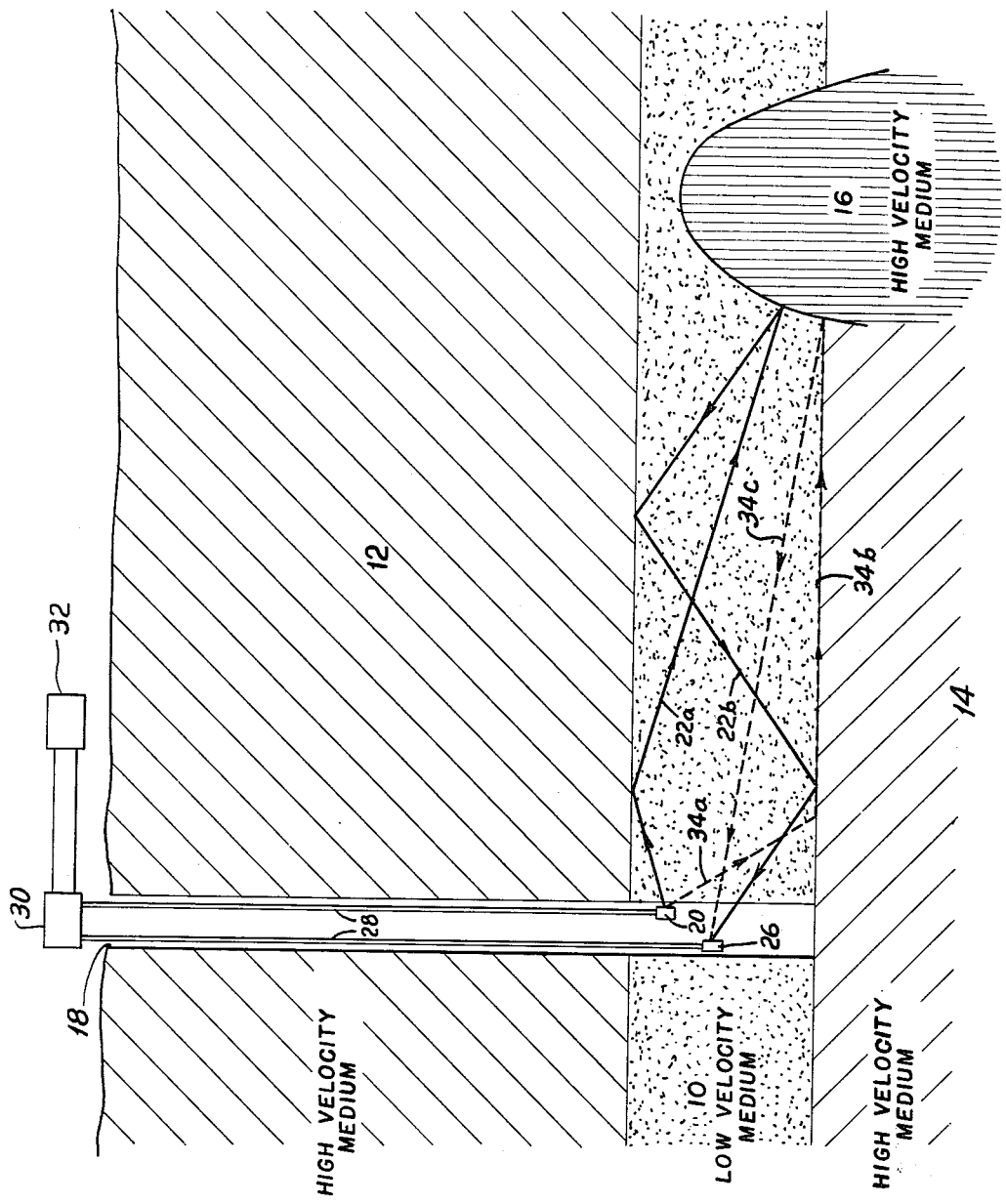
INVENTOR.
OSCAR WEISS
BY
John Farley
ATTORNEY United States Patent Office 2,718,929
Patented Sept. 27, 1955

2,718,929

SEISMIC METHOD OF GEOLOGICAL EXPLORATION

Oscar Weiss, Johannesburg, Transvaal, Union of South Africa, assignor to Weiss Geophysical Corporation, New York, N. Y., a corporation of New York Application June 18, 1951, Serial No. 232,079

5 Claims. (Cl. 181—0.5)

This invention relates to a novel method of geological exploration and more particularly to a novel method of seismic prospecting for minerals and oil.

The present application is a continuation-in-part of my application Serial Number 214,308, filed March 7, 1951.

In the aforementioned previous application, a method of geological exploration was described which depended, for its operation, on the existence of internal reflections of seismic waves within a low-velocity layer embedded in at least one medium of higher velocity. As explained in that application, as a result of successive internal reflections, the seismic energy will be largely confined to the low-velocity layer, allowing good energy transmission in this layer for long distances. Long distance transmission is particularly pronounced when the wave lengths of the seismic waves are less than the smallest dimension of the low-velocity layer. To best utilize the advantages of the long range propagation in a low-velocity layer, the source and detectors of seismic waves are placed in the low-velocity layer itself. In certain cases, however, the geometry of the low-velocity layer will allow outside energy to be trapped and to be propagated for some distance.

The present application is also concerned with the propagation of seismic waves associated with the existence of a low-viscosity layer embedded in high-velocity media. The present invention, however, is particularly concerned with the detection of seismic waves which are propagated for a considerable distance away from the source along the low-velocity layer, are then reflected by the surface of a body of high-velocity material intersecting or embedded in the low-velocity layer, and eventually reach the detector or detectors. The source of seismic waves, which may be referred to as an excitor, and the detector are located near each other, within or near the low-velocity medium, in one form of the invention. For this purpose use may be made of boreholes, shafts, mine workings, or outcrops of low-velocity material.

One object of the invention is to locate bodies of high-velocity material, for example, salt domes or coral reefs, embedded in or intersecting a layer of relatively low-velocity material, such as shale, this low-velocity layer being bounded on each side by high-velocity material such as limestone or dolomite.

Another object of the invention is to obtain a time spectrum of reflections from the high-velocity body to be located, and from this time spectrum, to calculate the position of said body.

A feature of one embodiment of the invention is that measurements of the azimuths and vertical angles of wave arrivals at the detectors may be made and from this data the position of the high-velocity body may be calculated.

The low-velocity layer is caused to act as a wave guide for seismic waves. By "acting as a wave guide" is meant that the seismic waves incident upon the boundaries of the low-velocity layer at angles greater than the critical angle are propagated through the layer for a considerable distance, since they cannot readily escape from the low-velocity layer by refraction through its approximately parallel faces. This propagation of seismic waves over long distances is explained by successive internal reflections within the low-velocity layer, until the waves reach a discontinuity in the layer, such as its edge, or its common boundary with an embedded or intersecting body of high-velocity material. At such a boundary, some seismic waves are refracted and the remainder are reflected back into the low-velocity layer. The reflected waves that strike the parallel boundaries of the low-velocity layer at angles greater than the critical angle will again be propagated for considerable distances by successive internal reflections, and some of these reflected waves will reach the detectors.

As a result of the wave guide effect, the waves are propagated over unexpectedly long distances, carrying a surprisingly high amount of energy. The wave guide effect tends to be more pronounced for seismic waves of higher frequencies than are usually employed in seismic prospecting. For example, seismic waves having wave lengths equal to or less than the thickness of the low-velocity layer give a more pronounced wave guide effect than those of longer wave length. The wave guide effect also tends to be more pronounced the greater the difference between the wave propagation velocities of the low-velocity layer and the high-velocity media opposed to its generally parallel faces.

These and other features, objects and variations will become apparent in connection with the following detailed description and with reference to the accompanying drawing.

The drawing, which comprises a single figure, shows a low-velocity layer embedded between layers of high-velocity media and illustrates one form of the method of the present invention for locating a body of high-velocity material intersecting the low-velocity layer.

In the figure there is shown a layer 10, of low-velocity material, for example, shale, having approximately parallel upper and lower horizontal faces, and bounded above and below by layers 12 and 14 of relatively high-velocity material such as dolomite. A body of high-velocity material, such as a salt dome or coral reef 16, intersects the low-velocity layer 10. A borehole 18 extends from the surface of the ground through the layer 10. In the present example, it may be assumed that the object is to ascertain whether such a body as 16 exists, and if so, its location. It may also be assumed that from core samples extracted through this borehole, the thickness of the layer 10 is known. The velocity of propagation of seismic waves in the low-velocity material of this layer is also known from previous measurements.

There is shown, in the borehole, a source 20 of seismic waves, an incident ray 22a emanating from this source and striking the body 16 after traveling through the low-velocity layer 10 via a path which may include one or more internal reflections, and a reflected ray 22b finally reaching a detector 26. The detector 26 may, in the present illustration, be assumed to be of a type adapted to respond only to seismic waves or components thereof arriving at it from the direction in which it is pointed. As a variation, three such detectors oriented along three mutually perpendicular axes may be employed instead of the aforementioned single detector. The detector 26 and the excitor 20 are electrically connected via connecting means 28 to control apparatus 30, which in turn is connected to a recorder 32. More particularly, the control apparatus 30 is adapted, by an electrical connection, to initiate and control the generation of seismic waves by the excitor 20. The excitor 20 may be of the type adapted to produce an explosion or continuous or intermittent vibrations. If of the type adapted to produce such vibrations, it may be an oscillator of the electrodynamic, piezo-electric or magnetostriction type, the control aparatus 30 may also include a servo arrangement for pointing the detector 26 in any desired direction, both in azimuth and elevation, and suitable means are provided for recording at any given moment the direction in which the detector is pointing.

It is clear, from the laws of geometrical optics, assumed to hold also in seismology, that more than one path is possible from the source to the high velocity body to be located and from there to the detectors, depending upon the thickness of the low-velocity layer, the distances from the seismic source and the detectors to surface to be located, upon the shape and attitude of this surface and upon the total number of internal reflections in the complete path from source to detector.

In addition to the paths which have been mentioned, there is also another possible path of some importance. It has been explained that waves incident upon the parallel boundaries of the low-velocity layer at angles greater than the critical angle are subjected to total internal reflection. However, incidence at the critical angle, as shown by the ray 34a, will allow waves to travel at the interface between the low and high velocity layers, as shown by at 34b, with the highest velocity of the two. Such a ray as 34b may be reflected by the reflecting common boundary, such as the boundary of the body 16, emerge into the low-velocity layer, and travel towards the detectors either directly, as shown by 34c, or by successive internal reflections, or by travelling at the second interface by refraction. Depending upon the velocity ratios involved and on the geometrical factors, a number of combinations are possible between the various paths mentioned above.

Seismic waves are generated continuously or intermittently by the exciter, and the magnitude of the detected wave is recorded as a function of the azimuth or the angle of tilt of the detector, or both. The azimuth of maximum signal intensity corresponds to the direction of the body to be located as measured from the borehole. The angle of tilt may or may not be in the direction of the body, depending on whether the wave is returned directly or by internal reflections or by refraction. Thus this angle of elevation can be used to determine the return path. If similar observations are made at a second detector position, for example in a second borehole, the location of the reflecting body can be determined by triangulation.

In one embodiment of the present invention, the arrival times of the different waves are measured from a certain origin, usually the detonation instant at the source. These arrival times, considered on a time basis, will constitute a spectrum characteristic of each problem. Assuming that all the above mentioned paths are possible, the first arrival, neglecting the normal reflections on the parallel boundaries, will be the refracted wave, then the direct wave followed by the waves that suffered internal reflections in increasing numbers. It is clear that these arrival times, and more particularly the differences of these arrival times taken in pairs, can be used to determine the location of the reflecting boundary. A further variation of the present invention consists in the simultaneous use of the direction of arrival of the waves with their travel times.

The direction of wave arrival can also be determined by recording simultaneously the wave components from three detectors placed along three mutually perpendicular axes.

In addition to the previously mentioned means for producing seismic waves, other means may be employed simultaneously, successively or separately, such as, piercing shot into the wall of the borehole, directional or non-directional explosive shots.

As another variation, a deflection may be drilled into the side of the borehole and the deflection chamber may be used either for the exciter or detector location. Buffer plates or plugs may be used between the exciter and detectors in the same borehole to reduce the direct effect of the exciter on the detector.

As still another variation, the exciter and detectors may be placed in different boreholes. In all variations of the present method, the source of excitation and detectors should be placed within the vicinity of the low-velocity medium.

A further variation consists in using multiple directional detectors in one location but oriented in different directions.

In one embodiment of the present invention, the excitor and detectors are placed in the low-velocity material and connected by suitable cables to the control and recording devices at the surface. It is however possible to use self-contained units at the detector positions so that the recording in any desired position is accomplished automatically.

While certain preferred embodiments of the invention have been shown and described, many further modifications may be made without departing from the spirit and scope of the present invention. It is therefore intended that the invention be limited only by the terms of the appended claims.

I claim:

1. In a method of geological exploration for determining, from within a borehole extending into a subterranean low-velocity layer, the location with respect to said borehole of a body remote therefrom having a high velocity of propagation for seismic waves, said body extending into said low-velocity layer and having a common boundary therewith remote from said borehole, said low-velocity layer being bounded above and below by at least one medium of higher velocity than said layer and meeting said medium at two opposed, generally parallel planes, in combination, the steps of lowering a source of seismic energy into said low-velocity layer in a borehole intersecting said layer, directing into said layer from said source seismic waves substantially all of which have a wave length less than the thickness of said layer, whereby a significant portion of said seismic waves will be propagated through said low-velocity layer as a wave guide by total internal reflection until they reach said remote common boundary, and will be reflected at said boundary and propagated within said layer by total internal reflection back to said borehole, and detecting, at a point within said layer in said borehole at about the same elevation as said source, said reflected waves returning to said borehole.

2. A method of geological exploration for locating a body having a high velocity of propagation for seismic waves, said body having a common boundary with a low-velocity layer embedded in and bounded above and below by media of higher velocity, comprising the steps of applying to said layer at a point in said layer remote from said body seismic waves substantially all of which have wave lengths less than the thickness of said layer, to cause said seismic waves to be propagated along said layer as a wave guide and to be reflected from said body back along said layer, detecting said reflected waves arriving at a point near the point where said waves were applied, and measuring the direction of arrival of said reflected waves at said last-mentioned point and their magnitude as a function of time.

3. A method of gelogical exploration for locating a body having a high velocity of propagation for seismic waves, said body extending into said low-velocity layer and having a common boundary therewith, said low-velocity layer being bounded above and below by at least one medium of higher velocity than said layer and meeting said medium at two opposed, generally parallel planes, in combination, the steps of lowering a source of seismic energy into said low-velocity layer in a borehole intersecting said layer, applying to said layer from said source seismic waves substantially all of which have a wave length less than the thickness of said layer, whereby a significant portion of said seismic waves will be propagated through said low-velocity layer as a wave guide by total internal reflection until they reach said remote common boundary, and will be reflected at said boundary and again propagated within said layer by total internal reflection, and detecting the magnitude of said reflected waves as a function of time, at a point in said layer.

4. A method of geological exploration for locating a body having a high velocity of propagation for seismic waves, said body having a common boundary with a low-velocity layer embedded in and bounded above and below by media of higher velocity, comprising the steps of applying to said layer at a point in said layer remote from said body seismic waves of high enough frequency that a major portion of them have wave lengths less than the thickness of said layer, to cause said seismic waves to be propagated along said layer as a wave guide and to be reflected from said body back along said layer, detecting said reflected waves arriving at a point in said layer, and measuring the magnitude of said reflected waves at said last-mentioned point as a function of time.

5. A method of gelogical exploration for locating a body having a high velocity of propagation for seismic waves, said body having a common boundary with a low-velocity layer embedded in and bounded above and below by media of higher velocity, comprising the steps of applying to said layer at a point in said layer remote from said body seismic waves of high enough frequency that a major portion of said waves will be propagated along said layer as a wave guide and reflected from said body back along said layer, detecting said reflected waves arriving at a point in said layer, and measuring the magnitude of said reflected waves at said last-mentioned point as a function of time.

References Cited in the file of this patent

UNITED STATES PATENTS

| | | |
|---|---|---|
| 1,240,328 | Fessenden | Sept. 18, 1917 |
| 2,191,119 | Schlumberger | Feb. 20, 1940 |
| 2,207,281 | Athy et al. | July 9, 1940 |
| 2,231,243 | Beers | Feb. 11, 1941 |
| 2,233,992 | Wyckoff | Mar. 4, 1941 |
| 2,249,108 | Beers | July 15, 1941 |
| 2,301,458 | Salvatini | Nov. 10, 1942 |
| 2,350,371 | Smith | June 6, 1944 |